(12) United States Patent
Kunder (10) Patent No.: US 11,995,136 B2
(45) Date of Patent: May 28, 2024

(54) USER NETWORK-BASED SUGGESTION FOR WEB BROWSER

(71) Applicant: RETAILMENOT, INC., Los Angeles, CA (US)

(72) Inventor: Justin Kunder, Washougal, WA (US)

(73) Assignee: RETAILMENOT, INC., Los Angeles, CA (US)

( * ) Notice: Subject to any disclaimer, the term of this patent is extended or adjusted under 35 U.S.C. 154(b) by 262 days.

(21) Appl. No.: 17/380,844

(22) Filed: Jul. 20, 2021

(65) Prior Publication Data

US 2023/0025668 A1  Jan. 26, 2023

(51) Int. Cl.
G06F 16/9535  (2019.01)
G06F 9/54  (2006.01)
G06F 16/9538  (2019.01)
G06F 16/955  (2019.01)

(52) U.S. Cl.
CPC .......... *G06F 16/9535* (2019.01); *G06F 9/547* (2013.01); *G06F 16/9538* (2019.01); *G06F 16/9566* (2019.01)

(58) Field of Classification Search
CPC .. G06F 16/951; G06F 16/953; G06F 16/9532; G06F 16/9535; G06F 16/9536; G06F 16/9538; G06F 16/9566; G06F 9/547
See application file for complete search history.

(56) References Cited

U.S. PATENT DOCUMENTS

| | | | | |
|---|---|---|---|---|
| 11,354,694 B2 * | 6/2022 | Glazier | ................. | G06Q 50/01 |
| 11,430,000 B1 * | 8/2022 | Depaolo | ............ | G06Q 30/0601 |
| 2013/0080225 A1 * | 3/2013 | Rajaram | ................ | G06Q 30/02 |
| | | | | 705/14.16 |
| 2014/0006125 A1 * | 1/2014 | Meegan | ................ | G06Q 50/01 |
| | | | | 705/14.16 |

* cited by examiner

Primary Examiner — Kris E Mackes
(74) Attorney, Agent, or Firm — Aikin & Gallant, LLP (57) ABSTRACT

A computing device, running a web browser, can listen for an event on the web browser that is operated by a first user. In response to an occurrence of a first event, the computing device can obtain, through the web browser a URL or content of a web page being visited by the web browser. The computing device can obtain a unique identifier that is uniquely associated with a second user, based on the second user belonging to a network of users that is associated with the first user, and based on whether the unique identifier is applicable to the URL or the web page that is open in the browser. The computing device can present the unique identifier to the first user through the web browser.

20 Claims, 5 Drawing Sheets

LISTEN FOR AN EVENT ON A WEB BROWSER OPERATED BY A FIRST USER 202

↓

IN RESPONSE TO AN OCCURRENCE OF A FIRST EVENT, OBTAIN, THROUGH THE WEB BROWSER A URL OR CONTENT OF A WEB PAGE THAT IS OPEN ON THE WEB BROWSER 204

↓

SEARCH A DATABASE FOR A UNIQUE IDENTIFIER THAT IS UNIQUELY ASSOCIATED WITH A SECOND USER, BASED ON THE SECOND USER BELONGING TO A NETWORK OF USERS THAT IS ASSOCIATED WITH THE FIRST USER, AND BASED ON WHETHER THE UNIQUE IDENTIFIER IS APPLICABLE TO THE URL OR THE WEB PAGE 206

↓

PRESENT THE UNIQUE IDENTIFIER TO THE FIRST USER THROUGH THE WEB BROWSER 208

USER NETWORK-BASED SUGGESTION FOR WEB BROWSER

CROSS-REFERENCE TO RELATED APPLICATIONS

None.

BACKGROUND

Users can use a web browser on a computing device such as, for example, a laptop computer, a tablet computer, a smart phone, or other computing device, to browse different websites. A web browser can retrieve data from an internet connected server at a given internet address which can be understood as a uniform resource locator (URL). The web browser can process this data, which can be written in a hypertext markup language (HTML) to determine and render visual components that make up a web page in the web browser.

The web browser can present the visual components of the web page to the browser. Some web pages can allow a user to interact with the web page. A user can navigate through web page, interact with buttons and forms, purchase products, and more.

SUMMARY

In one aspect, a method, performed by a computing device, can include listening for an event on a web browser operated by a first user (e.g., a browser user). A first event can be received through the web browser that indicates a URL or content of a web page that is open on the web browser. A database can be searched for a unique identifier that is uniquely associated with a second user. The search can be performed based on criteria such as the second user belonging to a network of users that is associated with the first user, and based on whether the unique identifier is applicable to the URL or content of the web page. The unique identifier can be presented to the first user through the web browser. In such a manner, a unique identifier can be presented to a user immediately, at the moment the user is browsing a web page. Further, the unique identifier can be associated with a network of users that is associated with the user which can increase the likelihood that the user to apply the unique identifier within the web page.

In some aspects, the method may also include storing, in the database, a plurality of unique identifiers that are each uniquely associated with the second user, and displaying to the second user whether or not each of the plurality of unique identifiers have been applied or which users applied each of the plurality of unique identifiers. In such a manner, the method can provide a centralized platform for storing and managing unique identifiers that are associated with the user.

In some aspects, the network of users that are associated with the first user are determined by using a token to retrieve the network of users that are associated with the first user. The network of users and the association of the network of users with the first user can be stored in the database. Other technical features may be readily apparent to one skilled in the art from the following figures, descriptions, and claims.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary. Other technical features may be readily apparent to one skilled in the art from the following figures, descriptions, and claims.

DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

A user may be associated with a unique identifier. That user can share this unique identifier with those in the user's network such as friends, acquaintances, and family, with the hope that the friends, acquaintances, or family will use this unique identifier when purchasing a product. A product can include, for example, a good, service, subscription, and/or other product.

The unique identifier can be applied by someone in the user's network during a purchase, to provide a benefit to that someone, such as, for example, a discounted price, or an enhancement to or upgraded version of the product. The unique identifier can be traced back to the user for the user's benefit. For example, the user can receive a discount or credit towards that may be used for a future product.

In some cases, however, by the time the user shares this unique identifier with someone in the user's network, that someone may have already purchased the product. Further, the user may not wish to share a unique identifier with people in the user's network, because such an exchange may be awkward or come off as self-serving.

Further, someone in the user's network may wish to find a unique identifier when browsing a web page for a product. That someone may have trouble finding a trusted source for a unique identifier that can be applied on the web page for the product.

Aspects of the present disclosure can address issues identified herein. A unique identifier can be presented to a first user immediately; at the moment the first user is browsing a web page. Further, the unique identifier can be associated with a second user that is in the first user's network, which can incentivize the first user to apply the unique identifier within the web page. The unique identifier can be shared to those within the second user's network in an automated and on-demand manner, so that the second user need not individually reach out to each person in the second user's network.

Figure 1:
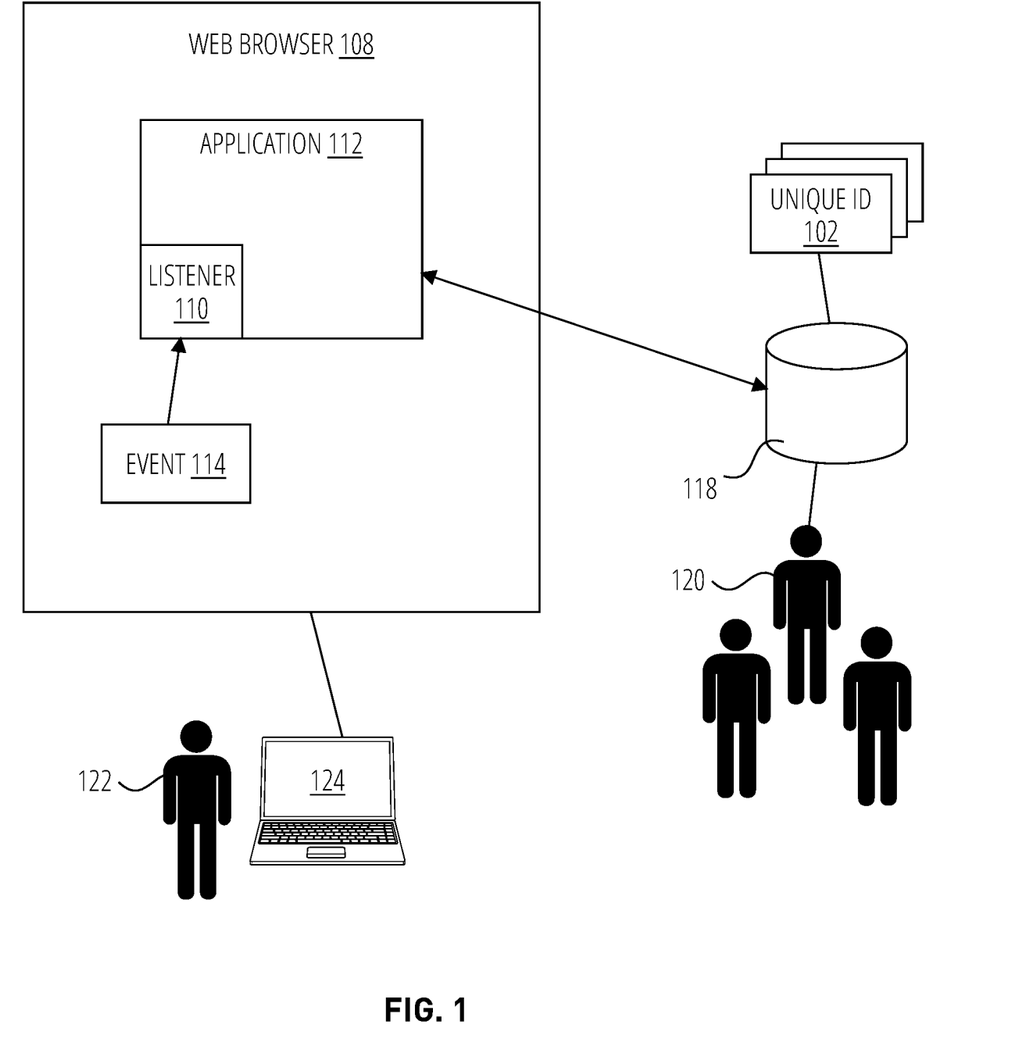
FIG. 1 illustrates a system for presenting a unique identifier through a web browser, according to some embodiments.

FIG. 1 illustrates a system for presenting a unique identifier in accordance with one embodiment. A first user 122 which can be understood as a browser user, can operate a computing device 124 such as for example, a laptop computer, a tablet computer, a smart phone, or other computing device. The computing device can run a web browser 108 for presenting websites to the browser user. The browser user can use an input device such as, for example, a keyboard, a mouse, a touchscreen display, or other input device to navigate from one web page to another. The browser user can to interact with a web page, such as by entering information to a field, clicking a button, selecting an image or link, and more.

The web browser can include an application 112 that can, in some embodiments, be implemented as a plug-in or a browser extension. The application 112 can include one or more background scripts (e.g., a service worker), content scripts, a user interface, or other components. Such scripts can be executed by the browser during runtime of the browser. The application 112 can cause one or more graphical user interfaces (GUI) to be rendered and displayed. These GUIs can present text, images, animations, and other visual elements to the user. These GUIs can be understood as pop-up windows.

The application can include one or more listeners 110 to listen for one or more browser events 114. A listener, which can also be understood as an event listener, can include processing logic that is performed in response to an event. A listener can reside in a background script of the application. Listening for an event on the web browser can be performed using an application programming interface (API) of the web browser. For example, a web browser such as for example, Firefox or Chrome, can have API that defines various listeners that each listen for a specific type of event. An application can include one or more listeners that each listen for and respond to an event.

An event can be understood as an object that allows the application 108 to be notified when something happens. There can be various events. Some events can be generated based on user activity. Other events can be based on activity from the website, from the browser, or from the underlying environment of the computing device such as, for example, an operating system of the computing device. Examples of events can include a button press, keyboard strokes, loading of a web page, a mouse click, resizing a window, an action from an animation or media player from a website, a completion of a browser request, a database operation, an action from a browser form (e.g., construction, reset, submission thereof), loading or unloading of a document, lapsing of a timer, when a payment is made, or other event.

The one or more listeners 110 can listen for an event and, in response to an occurrence of the event, a URL or content of the web page can be obtained by the application. A URL can be understood as an address of a web page, or as a reference to a web resource that specifies a location on a computer network to retrieve the web resource from. Content of the web page can include, for example, symbols such as numbers or text on the web page, web page metadata, images, HTML, or other content of the web page.

With the URL and/or content of the web page, the application can search through one or more databases 118 for a unique identifier 102 that is uniquely associated with a second user 116, based on the second user belonging to a network of users that is associated with the first user 122, and based on whether the unique identifier is applicable to the URL or the web page.

For example, the browser user can have an open web page with URL 'mattress.xyz' that markets mattresses. Upon occurrence of an event 114 (for example, a load of the webpage), listener 110 can obtain web page information such as URL or other web page content. In response, the application can search the database 118 for one or more unique identifiers 102 that can be applied on 'mattress.xyz'. In some embodiments, each unique identifier in the database can be tagged with metadata that indicates a URL and/or product provider for which the unique identifier can be applied. Thus, the application can search the database and extract those unique identifiers that are tagged as being applicable to 'mattress.xyz'. In some embodiments, a unique identifier can be tagged with URL data when the unique identifier is applied on a web page. The application can store the URL as metadata for that unique identifier which can be used to search for unique identifiers upon future visits to the web page.

Among all unique identifiers that are deemed to be applicable to 'mattress.xyz', the application can return one or more unique identifiers that are associated with users such as second user 120 who are within the browser user's network (e.g., a social network). For example, if the search returned another unique identifier that is applicable to 'mattress.xyz' but this unique identifier is associated with a third user that is not within the first user 122's network, then this unique identifier can be ignored by the application and not presented to the first user.

The application can present the one or more unique identifiers to the first user through the web browser. If there are no unique identifiers that are applicable to 'mattress.xyz', or if none of the unique identifiers are associated with someone that is in the first user's network, then the application may not have a unique identifier to present. In some cases, if more than one unique identifier is returned, then these unique identifiers can be presented as a list.

As discussed, the application can present the unique identifier within a pop up window. The pop up window can have one or more inputs that a user can select which can cause the unique identifier to be copied to a digital clipboard of the computing device. As such, the user can paste this unique identifier in an input field of the web page during a check out process on the web page.

In some embodiments, the application can present to the first user, all unique identifiers that are found to be applicable to the URL or the web page. Those unique identifiers that are associated with users that are in the first user's network can be marked differently from the other unique identifiers, for example, with text, a symbol, color, a visual cue, or presented in a separate list. As such, the first user can select from all the unique identifiers, but with added knowledge that selection of some of the unique identifiers may confer a benefit to someone in the first user's network.

In such a manner, application 112 can automatically present one or more unique identifiers to the first user 122 based on the user's interaction with the website. Further, these unique identifiers are associated with one or more second users 120 that are within the first user's network, which can be a trusted source for the first user 122, thereby possibly increasing likelihood of conversion. Second users 120 that are each associated with a unique identifier need not individually and manually share these unique identifiers to those within their respective networks, which can be less effective due to timing-a product of interest may already be purchased by first user 122 by the time that second user 120 reaches out to share the unique identifier with first user 122.

A unique identifier can be a combination of symbols such as letters, numbers, a barcode, a QR code, or other unique identifier. Further, in some embodiments, each unique identifier can be uniquely associated with a single user. An association can be understood as a reference from one object (e.g., a unique identifier) to another object (e.g., a user) that is managed and available electronically (e.g., in a database). In some embodiments, a unique identifier can be a referral code that can be tracked by a product provider to confer a benefit to a referrer, which can be a user (e.g., user 120) that is associated with the unique identifier.

Figure 2:
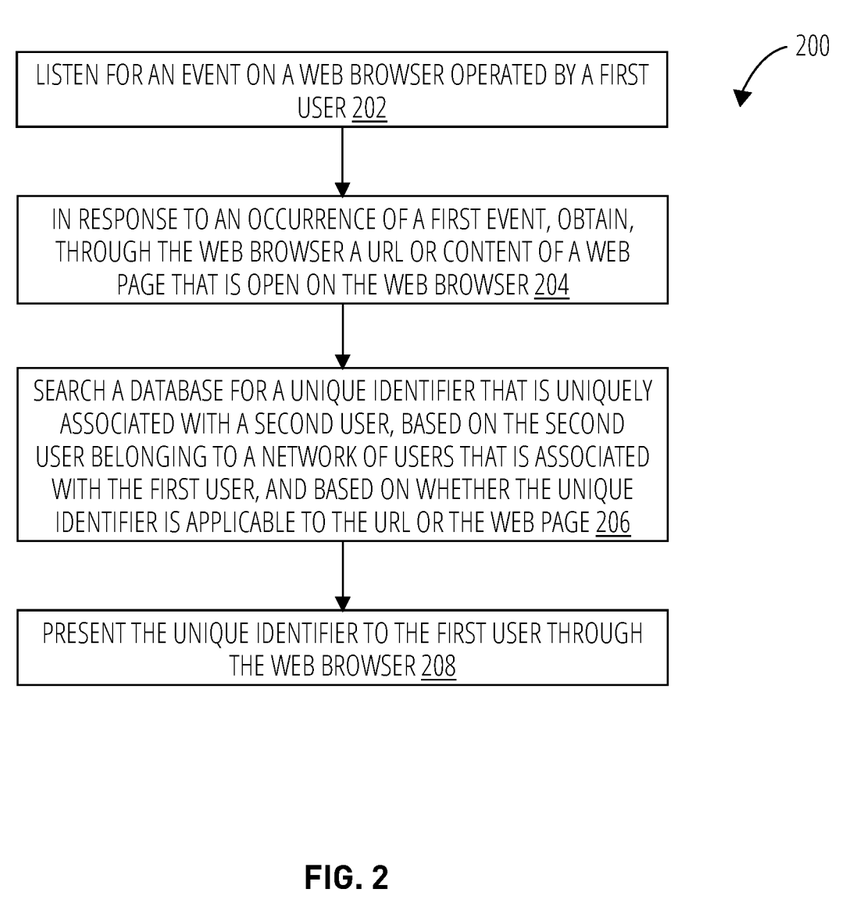
FIG. 2 illustrates a method for presenting a unique identifier through a web browser, according to some embodiments.

FIG. 2 illustrates a method 200 for presenting a unique identifier through a web browser, according to some embodiments. The method may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. Processing logic can be understood collectively as a computing device. Instructions can be organized as an application which can, in some embodiments, be implemented as a browser extension or plug in.

At block 202, processing logic listens for an event on a web browser operated by a first user. As discussed, an event can be browser event that fires based on user activity, web page activity, the underlying environment of the browser, a timer, or other activity deemed to be of interest.

At block 204, in response to an occurrence of a first event, processing logic obtains, through the web browser, a URL or content of web page being visited by the web browser. This can be performed, for example, through utilization of API of the web browser. For example, API may include one or more calls that 'get' the current URL of the web page, text on the web page, images, media files, metadata of the web page, or other content of the web page. In some embodiments, the content can be returned by an event. For example, when an event triggers, it may return a value such as a URL, and/or other values.

At block 206, processing logic searches a database for a unique identifier that is uniquely associated with a second user, based on the second user belonging to a network of users that is associated with the first user, and/or based on whether the unique identifier is applicable to the URL or the web page. Metadata can be stored for each unique identifier. This metadata can indicate a URL and/or underlying provide of a product to which the unique identifier can be applied.

For example, a unique identifier can have metadata that indicates that the unique identifier is applicable on 'mattress.xyz' and/or products that are provided by 'Mattress Superstore'. As such, processing logic can extract, from the database, any or all unique identifiers that are applicable to 'mattress.xyz' or products provided by 'Mattress Superstore'. Thus, if the URL that is obtained is not 'mattress.xyz' but another URL such as 'sleepytime.xyz', processing logic can gather and present unique identifiers that are applicable to 'Mattress superstore' based on the content of the web page which can indicate a relationship to 'Mattress superstore' or based on a knowledge that 'Mattress superstore' also presents products through 'sleepytime.xyz'.

At block 208, processing logic presents the unique identifier to the first user through the web browser. In some embodiments, processing logic can present multiple unique identifiers to the first user if multiple are found to be applicable. In some embodiments, all unique identifiers that are applicable can be presented to the first user, with some marked as being associated with second users that are within the first user's network.

Figure 3:
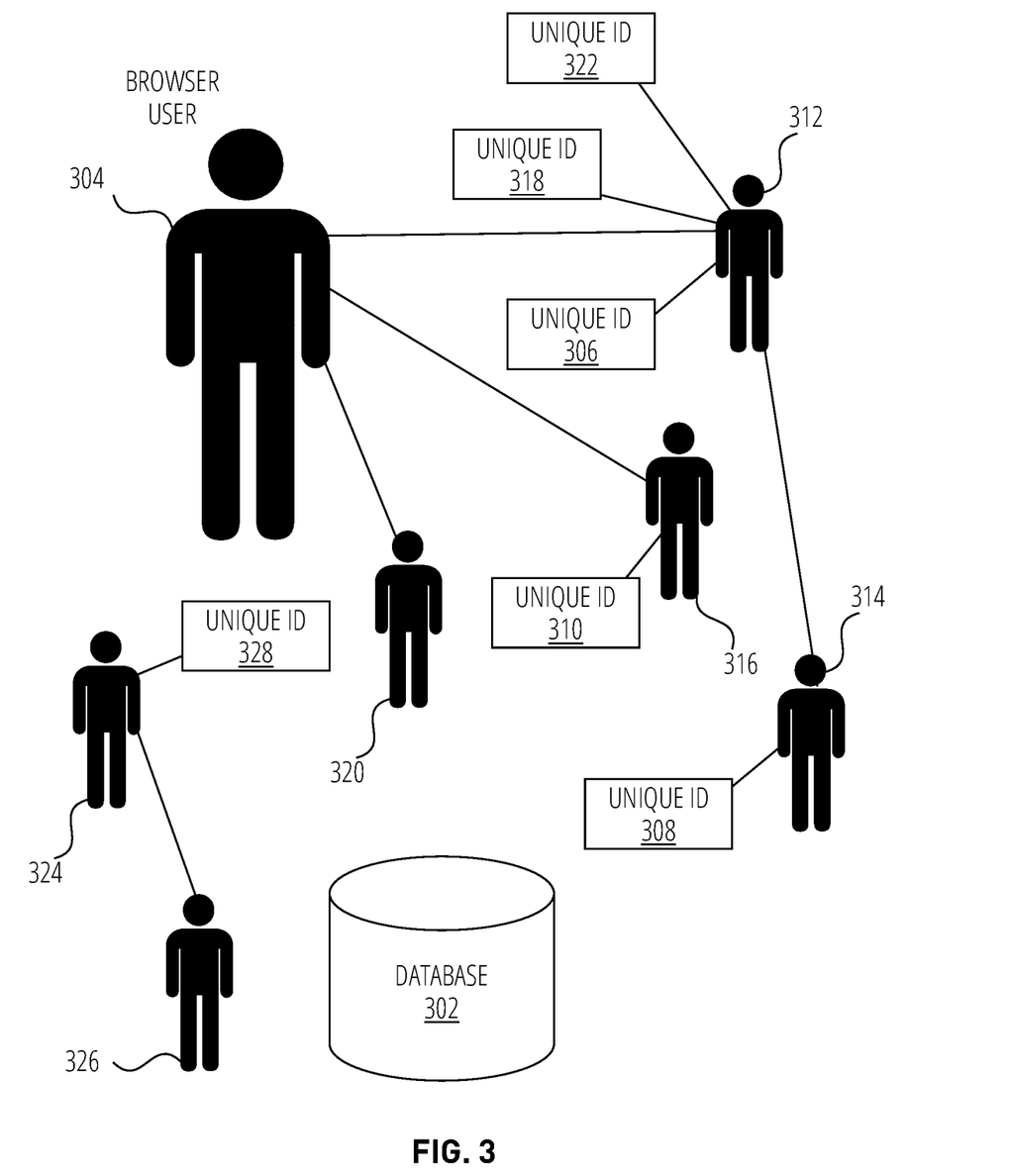
FIG. 3 illustrates a user network-based system for storing or retrieving a unique identifier, according to some embodiments.

FIG. 3 illustrates an example of a network-based system for storing or retrieving a unique identifier, according to some embodiments. The example shown here may not cover each and every possible scenario of such a system. It is shown to provide a further understanding of some of the embodiments of the present disclosure.

A database 302 can store and manage associations between each user of an application (e.g., application 112 or 406) and between each user and a unique identifier. For example, a user 312 can be associated with different unique identifiers such as unique identifier 322, 318, and 306. Each unique identifier may be applicable for a different product, on different web pages, and/or for different providers of a product. Unique identifier 322 may be applicable to a grocery subscription for provider 'Fresh Fruit' while unique identifier 318 may be applicable to one or more products that are marketed on 'mattress.xyz'. In some embodiments, users can enter and store unique identifiers to the database 302 through an application, as described in relation to FIG. 4.

The database 302 can store and manage associations between users, thereby characterizing a user's network. For example, a user 304 can be associated with user 320, user 312, and user 310. Each association can indicate a friendship, an acquaintance, a family member, and/or a business relationship. As such, user 304 can have a network that includes user 320, user 312, and user 310. User 314 can be out user 304's network. Similarly, user 324 and user 326 are out of user 304's network. Such network-based associations between users can be established and stored in the database as described in relation to FIG. 4.

Using database 302 as an example for FIG. 1, the application 112 can listen to browser events and obtain the URL or web content of the browser when a browser event is triggered. The application can communicate with the database 302 and search the database for unique identifiers that can be applied through the web page of the browser. The application can determine that unique identifiers 322, 310, 308, and 328 are applicable to the open web page of the browser, while unique identifiers 318 and 306 are not applicable to the open web page. Of the unique identifiers that are applicable to the open web page, unique identifier 322 and 310 can be presented to the user 304 because they are associated with users (312, 316) that are within user 304's network. Unique identifiers 308 and 328 can be ignored, or they can also be presented to the user, but shown differently from unique identifiers 322 and 310. Visual cues and/or text can be used to indicate which of the applicable unique identifiers are sourced within user 304's network and which are out of the user 304's network.

In another example, if user 324 uses a browser to open a web page, the application may determine that unique identifier 306 is applicable. The application may, in some examples, ignore unique identifier 306 because unique identifier 306 is associated with user 312, and user 312 is not in user 324's network. In other examples, the application can present unique identifier 306 to user 324, but may indicate through text or other visual cues that this unique identifier 306 is not associated with an in-network user.

In some embodiments, database 302 or other databases described in the present disclosure can be implemented as a plurality of databases. A database can be understood as a structured set of data that is stored and accessed electronically. The database can include memory that is managed by one or more computing devices. The computing device can be communicatively coupled to and accessible over a network through a communication protocol such as, TCP/IP, Wi-Fi, Ethernet, LTE, 4G, 5G, or other network communication protocol. As such, the database can be accessed by embodiments of the application described in the present disclosure.

Figure 4:
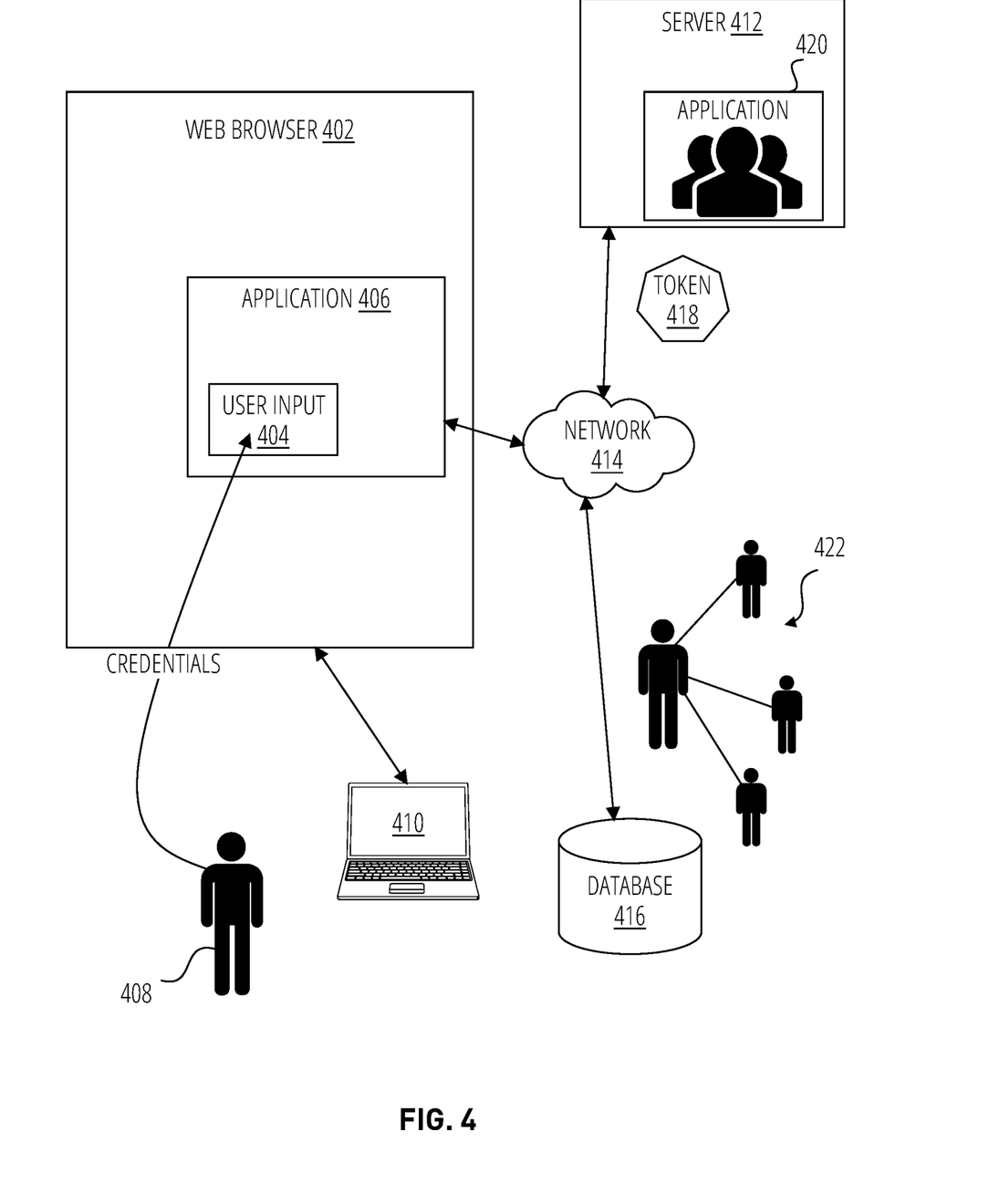
FIG. 4 illustrates a system for determining a user's network through a web browser, according to some embodiments.

FIG. 4 illustrates a system for determining a user's network through a web browser, according to some embodiments. A user 408 can operate a web browser 402 that runs on computing device 410. An application 406 can gather network contact information of the user and obtain one or more unique identifiers entered into the system by user 408. Components of the system shown, such as computing device 410, server 412, and database 416 can communicate over network 414 with one or more network communication protocols.

Application 406 can be implemented as a plug in or extension of a web browser 402. Application 406 and application 112 can be integrated as a single application. In other words, application 406 can include those features described in relation to application 112, and vice versa. As such, an application can allow a user to upload and store unique identifiers, gather the user's network information from another application to form the associations in the database 416, while also presenting unique identification codes to the user through the browser in an automated and on-demand manner. Database 416, 302, and 118 can be understood as a common database that application 406 and/or application 112 can write to and/or read from. Such a database can be implemented as a plurality of databases that can be distributed over the network (e.g., cloud-based).

The user 408 can log into the application 406 by providing credentials such as a username, email, and/or a password through a user input 404 of the application. The user input 404 can be a field, form, drop down menu, or other user input that receives input from a user. The input can be generated by a keyboard, touchscreen display, or other input device.

The application can use the credentials to obtain a token 418 from a server 412 or an application 420 hosted by the server. The token, or software token, can be understood as a digital object of an authentication security device that can be used to authorize use of one or more computer services. A token can use shared secret architecture, public-key cryptography, or other equivalent technology.

Once obtained, the application 406 can use token 418 to authorize use of computer services from server 412 or application 420 hosted by server 412. These computer services can include retrieving information that is specific to user 408. For example, the application 406 can use the token 418 to retrieve network associations of the user 408. Network associations can be understood as connections between the user 408 and other users as managed within application 420. Thus, the network associations can define user 408's network of friends, acquaintances, business contacts, and/or family. These network associations, can be managed by and obtainable from application 420. Token 418 may provide permissions for the computing services that are specific to user 408. Thus, with token 418, the application can obtain user 408's network, but not another user's network information. In some examples, application 420 can be a social networking application such as, for example, Facebook or LinkedIn.

It should be understood that in some examples, application 420 can be a distributed application that can be hosted by a plurality of servers represented by server 412. The application 406 may utilize one or more API that are supported by application 420 to collect network information of user 408 from application 420. Such network information can include, for example, other users 426 that are within the user 408's network as managed by application 420. Application 406 can cause this network information to be entered into database 416 to build up network information of different users.

It should be understood that each user that uses the application 406 can enter their own credentials through application 406, which can then be used to obtain a respective token, which in turn can be used to obtain respective network relationship information about that user, which is stored in database 416. In such a manner, the application 406 can obtain network relationships between users through a login of each user into the application 406.

In some embodiments, user 408 can enter one or more unique identifiers through application 406. Each of these unique identifiers can be associated with user 408. The application can store these unique identifiers and associations to database 416. For example, each unique identifier that user 408 enters into the application can be stored as user 408's unique identifier. Thus, the application can serve as a centralized platform for a user to store and organize unique identifiers that would confer a benefit to that user. Further, these stored unique identifiers can be automatically presented to other users in the user's network in an on-demand manner as described in other sections. For example, when one of users 422 use a web browser to browse 'webpage.xyz', the application 406, which may be running as an extension on that user 422's browser, can present one of user 408's unique identifiers that is deemed to be applicable to the 'webpage.xyz'. It should be understood, however, that the association between unique identifier and user can also be managed by a provider of a product so that the provider can trace the code to the user to confer a benefit to the user.

Further, application 406 can, in response to an occurrence of a browser event, obtain through the web browser, an indication of whether a user has applied the unique identifier through an input of the browser. For example, one or more events can be triggered when one of users 422 uses a web browser and application 406 to browse 'webpage.xyz', and applies a unique identifier that is entered by and associated with user 408 during the checkout process to purchase a product on 'webpage.xyz'. An event can return one or more values which can be obtained by one or more listeners of the application 406. These values can indicate, for example, whether an input field on the web page contains the unique identifier, and/or whether a product has been purchased. Other information can be obtained from the web page in response to an event that can indicate whether or not a conversion has been made using the unique identifier through the browser. In such a manner, the application 406 can detect that the unique identifier which may be associated with a user 408 has been applied by user 422. The application can store this information in the database. Similarly, the application can store, in a database (e.g., database 416 or a different database), each unique identifier that is associated with and has been entered by user 408. Taken together, the application can store status of each unique identifier, such as which users 422 have used each unique identifier entered by and associated with user 408.

In some embodiments, the application 406 can present each of the unique identifiers to the user 408, as well as the status of each unique identifier, such as which users, if any, have applied each of the unique identifiers. This can be presented in a pop-up window on the user's device 410, generated by the application 406. In some examples, the application 406 can present a notification to user 408 such as, for example, an alert, notification, or email to a device of the user 408, in response to one of users 422 applying the unique identifier.

Figure 5:
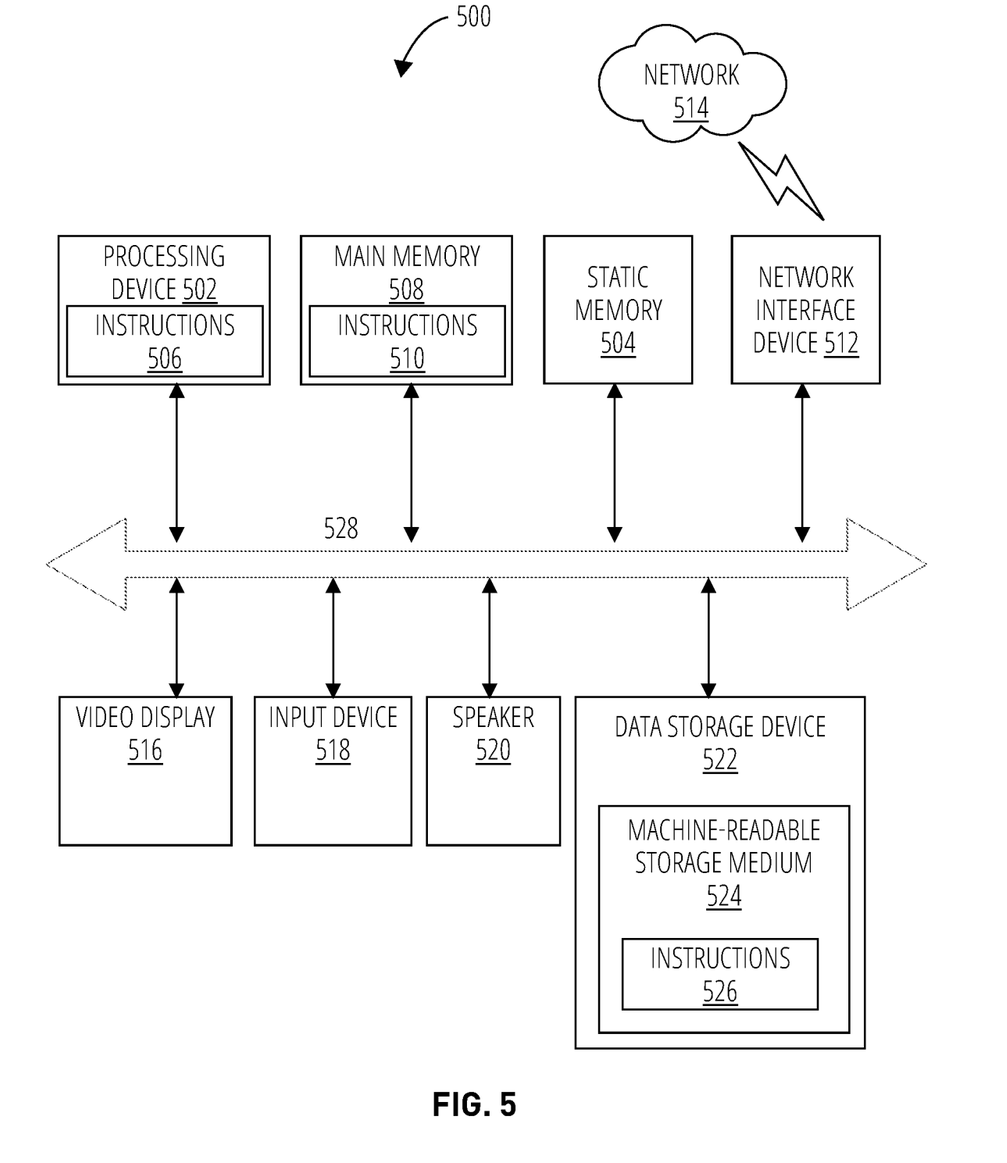
FIG. 5 illustrates an example computing device, according to some embodiments.

FIG. 5 illustrates an example computing device 500, according to some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while a single computing device is illustrated, the term "computing device" shall also be taken to include any collection of computing devices that individually or jointly execute a set (or multiple sets) of instructions to perform the methods discussed herein.

The example computing device 500 may include a processing device 502 (e.g., a general purpose processor, a PLD, etc.), a main memory 508 (e.g., synchronous dynamic random access memory (DRAM), read-only memory (ROM)), a static memory 504 (e.g., flash memory and a data storage device 522), which may communicate with each other via a bus 528.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more embodiments of the present disclosure, for performing the operations and steps discussed herein.

Computing device 500 may further include a network interface device 512 which may communicate with a network 514. The computing device 500 also may include a video display unit 516 (e.g., a liquid crystal display (LCD) or a cathode ray tube (CRT)), an input device 518 (e.g., a keyboard, a mouse), and an acoustic speaker 520. In some embodiments, video display unit 516 and input device 518, may be combined into a single component or device (e.g., an LCD touch screen).

Data storage device 522 may include a computer-readable storage medium 524 on which may be stored one or more sets of instructions that may include instructions 526 for a processing device (e.g., processing device 502), for carrying out the operations described herein, in accordance with one or more aspects of the present disclosure. Instructions 526 may also reside, completely or at least partially, within main memory 508 and/or within processing device 602 during execution thereof by computing device 500, main memory 508 and processing device 502 also constituting computer-readable media. The instructions 526 may further be transmitted or received over a network 514 via network interface device 512.

While computer-readable storage medium 524 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Various aspects described herein may be embodied, at least in part, in software. That is, the techniques may be carried out by a computing device in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the computing device.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the computing device may be performed by one or more programmable processors executing one or more computer programs stored on a non-transitory computer readable storage medium to perform the functions of the system. All or part of the computing device may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

To aid the Patent Office and any readers of any patent issued on this application in interpreting the claims appended hereto, applicants wish to note that they do not intend any of the appended claims or claim elements to invoke 35 U.S.C. 116(f) unless the words "means for" or "step for" are explicitly used in the particular claim.

What is claimed is:

1. A method, performed by a computing device, comprising:
storing, in a database, multiple unique identifiers, wherein each unique identifier is applicable to a different one of at least a product, a provider, or a web page;
listening, after the multiple unique identifiers are stored in the database, for an event on a web browser operated by a first user;
in response to an occurrence of a first event, obtaining, through the web browser a URL or content of a web page that is open on the web browser,
searching, after obtaining the URL or content of the web page, the database for a unique identifier among the multiple unique identifiers that are uniquely associated with a second user, based on the second user belonging to a network of users that is associated with the first user, and based on whether the unique identifier is applicable to the URL or the web page, wherein in the database the unique identifier is tagged with metadata that indicates the URL or the web page, and the unique identifier is extracted from the database based on a search utilizing the metadata; and
presenting the unique identifier to the first user through the web browser.

2. The method of claim 1, further comprising:
in response to an occurrence of a second event, obtaining, through the web browser, an indication of whether the first user has applied the unique identifier through an input of the browser; and
storing, in the database, whether the first user has applied the unique identifier.

3. The method of claim 1, further comprising presenting a notification to the second user whether the first user has applied the unique identifier.

4. The method of claim 1, further comprising displaying to the second user whether or not each of the multiple unique identifiers have been applied or which users applied each of the multiple unique identifiers.

5. The method of claim 1, wherein the method is performed by an application that is an extension of the web browser.

6. The method of claim 5, wherein listening for the event on the web browser is performed using an application programming interface (API) of the web browser.

7. The method of claim 1, wherein the network of users that are associated with the first user are determined by using a token to retrieve the network of users that are associated with the first user, and storing in the database, the network of users and the association of the network of users with the first user.

8. The method of claim 7, wherein the token is obtained through a login of the first user into the application.

9. A computing device comprising:
a processor; and
a memory storing instructions that, when executed by the processor, configure the apparatus to:
storing, in a database, multiple unique identifiers, wherein each unique identifier is applicable to a different one of at least a product, a provider, or a web page;
listen, after the multiple unique identifiers are stored in the database, for an event on a web browser operated by a first user;
in response to an occurrence of a first event, obtain, through the web browser a URL or content of a web page that is open on the web browser,
search, after obtaining the URL or content of the web page, the database for a unique identifier among the multiple unique identifiers that are uniquely associated with a second user, based on the second user belonging to a network of users that is associated with the first user, and based on whether the unique identifier is applicable to the URL or the web page, wherein in the database the unique identifier is tagged with metadata that indicates the URL or the web page, and the unique identifier is extracted from the database based on a search utilizing the metadata; and
present the unique identifier to the first user through the web browser.

10. The computing device of claim 9, wherein the instructions further configure the apparatus to:
in response to an occurrence of a second event, obtain, through the web browser, an indication of whether the first user has applied the unique identifier through an input of the browser; and
store, in the database, whether the first user has applied the unique identifier.

11. The computing device of claim 9, wherein the instructions further configure the apparatus to present a notification to the second user whether the first user has applied the unique identifier.

12. The computing device of claim 9, wherein the instructions further configure the apparatus to and displaying to the second user whether or not each of the multiple unique identifiers have been applied or which users applied each of the multiple unique identifiers.

13. The computing device of claim 9, wherein the instructions form an application that is an extension of the web browser.

14. The computing device of claim 13, wherein listening for the event on the web browser is performed using an application programming interface (API) of the web browser.

15. The computing device of claim 9, wherein the network of users that are associated with the first user are determined by using a token to retrieve the network of users that are associated with the first user, and store in the database, the network of users and the association of the network of users with the first user.

16. The computing device of claim 15, wherein the token is obtained through a login of the first user into the application.

17. A non-transitory computer-readable storage medium, the computer-readable storage medium including instructions that when executed by a computer, cause the computer to:
storing, in a database, multiple unique identifiers, wherein each unique identifier is applicable to a different one of at least a product, a provider, or a web page;
listen, after the multiple unique identifiers are stored in the database, for an event on a web browser operated by a first user;
in response to an occurrence of a first event, obtain, through the web browser a URL or content of a web page being visited by the web browser,
search, after obtaining the URL or content of the web page, the database for a unique identifier among the multiple unique identifiers that are uniquely associated with a second user, based on the second user belonging to a network of users that is associated with the first user, and based on whether the unique identifier is applicable to the URL or the web page, wherein in the database the unique identifier is tagged with metadata that indicates the URL or the web page, and the unique identifier is extracted from the database based on a search utilizing the metadata; and present the unique identifier to the first user through the web browser.

18. The computer-readable storage medium of claim 17, wherein the instructions further configure the computer to:

in response to an occurrence of a second event, obtain, through the web browser, an indication of whether the first user has applied the unique identifier through an input of the browser; and store, in the database, whether the first user has applied the unique identifier.

19. The computer-readable storage medium of claim 17, wherein the instructions further configure the computer to present a notification to the second user whether the first user has applied the unique identifier.

20. The computer-readable storage medium of claim 17, wherein the instructions further configure the computer to and displaying to the second user whether or not each of the multiple unique identifiers have been applied or which users applied each of the multiple unique identifiers.

* * * * *